June 9, 1925.  
L. J. BADARACCO  
1,540,744  
APPARATUS FOR WASHING AUTOMOBILES  
Filed April 21, 1923  2 Sheets-Sheet 1
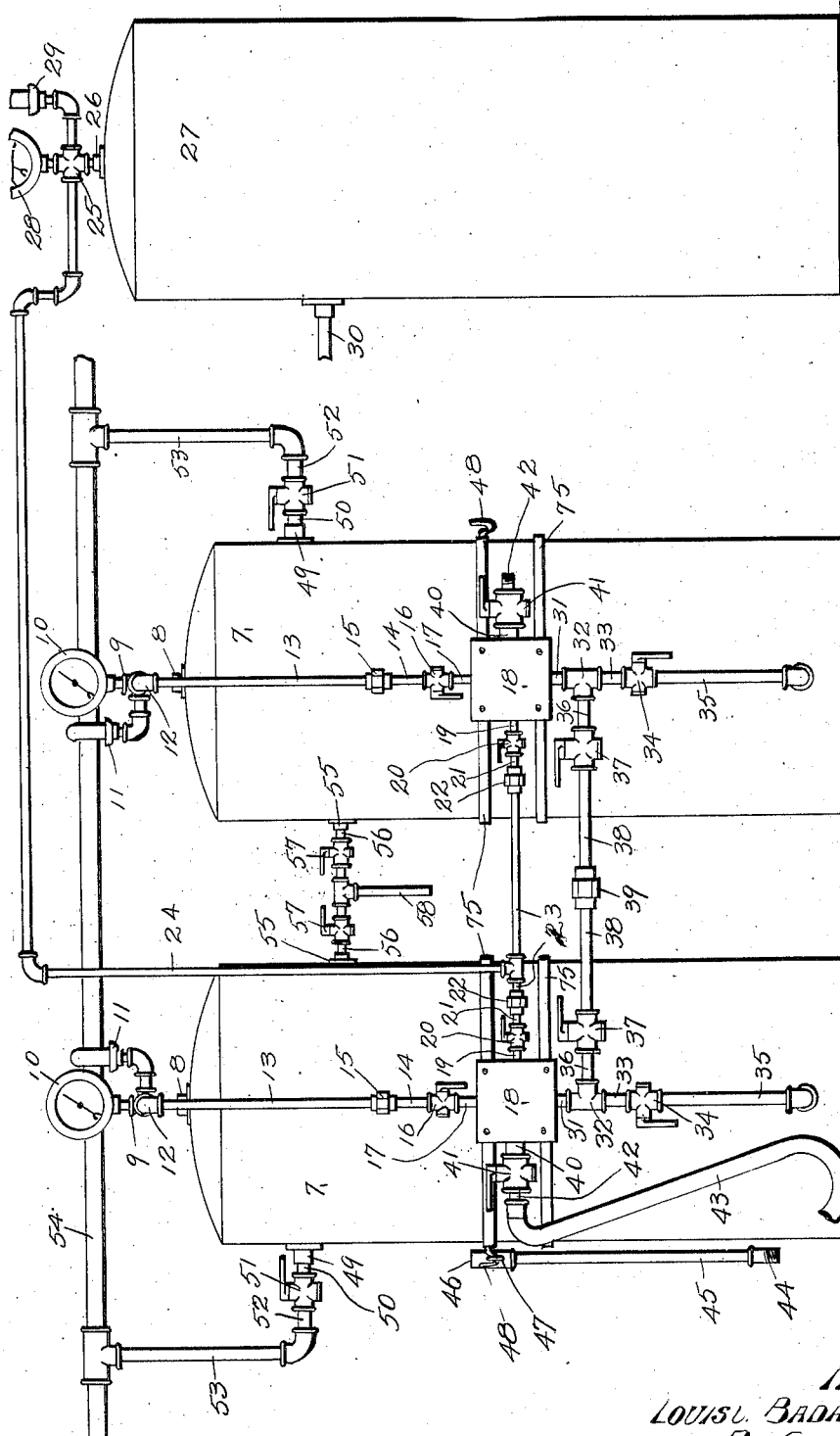
INVENTOR  
LOUIS L. BADARACCO  
BY Edward E. Longan  
ATTY.

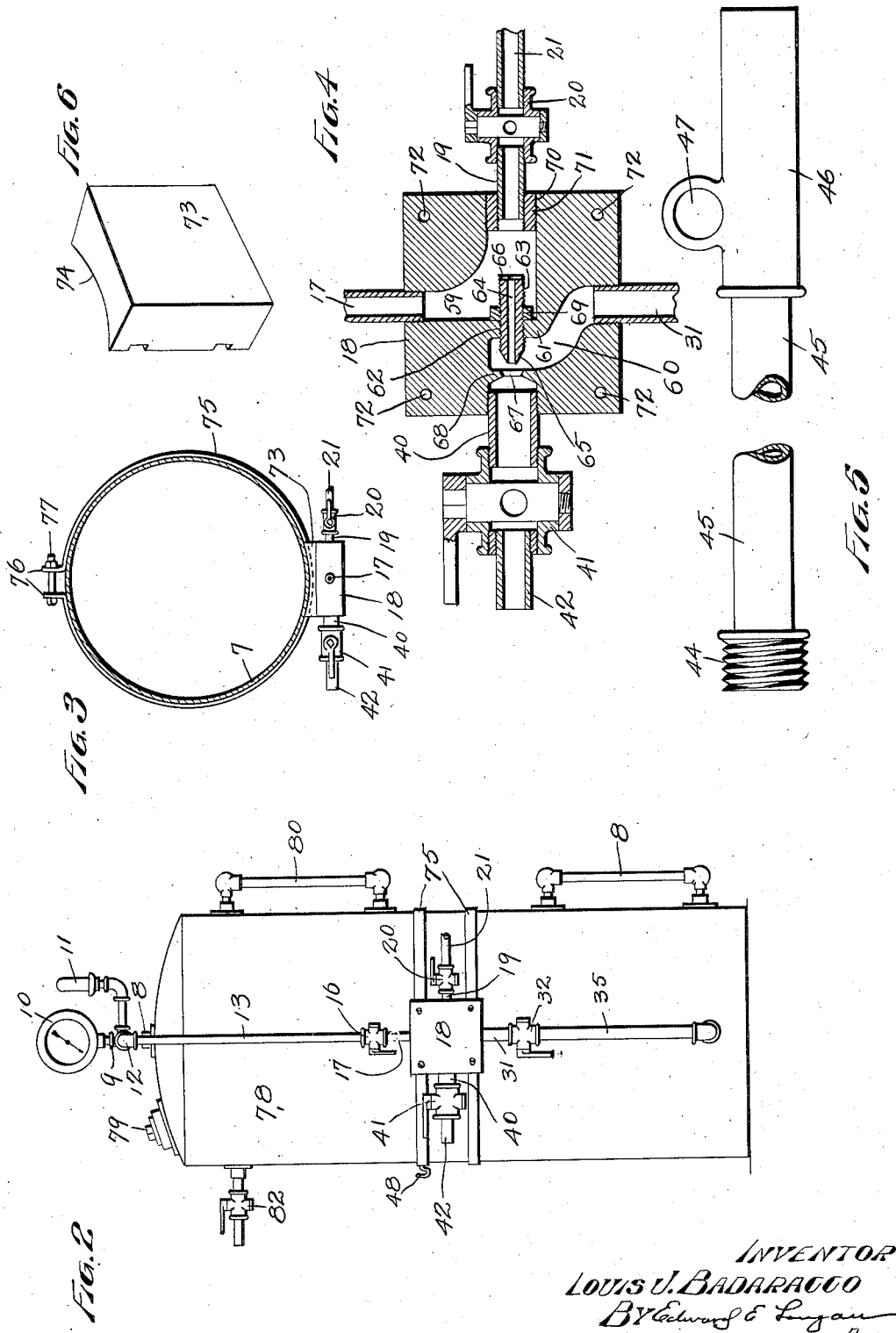

Patented June 9, 1925.

1,540,744

UNITED STATES PATENT OFFICE.

LOUIS J. BADARACCO, OF ST. LOUIS, MISSOURI, ASSIGNOR TO THE AUTO LAUNDRY SYSTEM COMPANY, OF ST. LOUIS, MISSOURI, A CORPORATION OF MISSOURI.

APPARATUS FOR WASHING AUTOMOBILES.

Application filed April 21, 1923. Serial No. 633,788.

*To all whom it may concern:*

Be it known that I, LOUIS J. BADARACCO, a citizen of the United States, and resident of the city of St. Louis and State of Missouri, have invented certain new and useful Improvements in Apparatus for Washing Automobiles, of which the following is a specification, containing a full, clear, and exact description, reference being had to the accompanying drawings, forming a part thereof.

My invention relates to improvements in apparatus for washing automobiles and has for its primary object an apparatus from which a liquid is adapted to be discharged under air pressure and intermingle with air under pressure so that a minimum amount of liquid is used to accomplish a maximum amount of cleaning.

A further object is to construct an apparatus for washing automobiles which is especially suitable in localities where the water supply is scarce or the cost of water extremely high.

A still further object is to construct an apparatus for washing automobiles, the cost of which is reasonable and one which does not occupy a great amount of space for installation and use.

In the drawings:—

Fig. 1 is a front elevation of my device showing the same connected up and in which two liquid tanks are employed;

Fig. 2 is a front elevation of a modified form of liquid tank;

Fig. 3 is a horizontal section through one of the tanks immediately above the mixing valve showing the manner of securing the same to the tank;

Fig. 4 is an enlarged vertical section of the mixing valve with portions of the piping connected thereto;

Fig. 5 is an enlarged side elevation of the nozzle employed with parts broken away and Fig. 6 is a perspective view of the block to which the mixing valve is secured.

In the construction of my device I employ a tank 7, the top of which is provided with a pipe flange 8. To this flange is connected a pipe connection 9, which carries a pressure gage 10, and a safety valve 11. To this pipe connection 9 is also secured an elbow 12 which carries a pipe 13. This pipe is connected to the pipe 14 by means of a coupling 15. The pipe 14 is attached to a valve 16 which in turn is secured to a nipple 17. The nipple 17 is secured in the mixing valve 18, as will be more fully hereafter described. The mixing valve 18 also has secured thereto a nipple 19 to which a valve 20 is secured. The valve 20 is in turn secured to a nipple or pipe 21, which carries a coupling 22. The coupling 22 is in turn secured to a nipple or pipe 23 which is secured to the pipe 24 by means of a suitable pipe fitting. The pipe 24 is the air line and is connected to a fitting 25 which is secured in the pipe flange 26 carried by the air tank 27. The fitting 25 also carries an air gage 28 and safety valve 29. The air tank 27 has secured thereto a pipe 30 which leads to a suitable air compressor, not shown. The mixing valve 18 also has secured therein a nipple 31 which is connected to a T 32. Secured in the T 32 is a nipple 33 which is attached to the valve 34. The valve 34 has attached thereto a pipe 35 which communicates with the tank 7 near its bottom. The T 32 has also secured therein a nipple 36 which carries a valve 37. The valve 37 has secured therein a pipe 38 which carries a coupling 39. The purpose of this is so the two tanks can be connected together and the water from one tank passed through the mixing valves of both tanks. The purpose of this will be explained in detail later.

The mixing valve 18 also has secured to its outlet a nipple 40 on which a valve 41 is secured. The valve 41 is provided with a screw threaded nipple or extension 42 to which a hose 43 is secured. The hose 43 is in turn secured to the screw threaded end 44 formed on the pipe 45. The pipe 45 is provided on its opposite end with a tip 46. This tip is provided with an integrally formed ring 47 by means of which the same can be hung on a suitable hook 48, when not in use. The screw threaded end 44, pipe 45 and tip 46 will hereafter be termed the nozzle.

Secured to the tank 7 is a pipe flange 49 in which a nipple 50 is secured, this nipple carries the valve 51. To the valve 51 is secured a nipple 52 which carries a pipe connection 53. This pipe connection is in turn secured to the water main 54 which leads to any suitable source of supply, preferably a city water main or to a storage tank. The tank 7 has also secured thereto, a pipe flange 55 which carries a nipple 56. This nipple in turn carries a valve 57 to which is attached a pipe connection 58. The purpose of this connection is to act as a gage for the amount of water admitted to the tank 7 and also to relieve the excess pressure and permit the escape of air while the tank is being filled with liquid.

The mixing valve 18 is provided with an air passage 59 and a liquid passage 60. In the air passage the nipples 17 and 19 are secured while in the liquid passage is secured the nipple 31. The passages 59 and 60 are separated by means of a wall 61 which is provided with a screw threaded opening 62. In this opening is seated a screw threaded nozzle 63. The nozzle is provided with a central passage 64. The forward end of the nozzle is tapered as at 65, while the rear end is provided with a slot 66. The slot is for the purpose of adjusting the nozzle to and from the seat 67 formed in the wall 68. This wall is located between the passage 60 and the outlet and has the seat 67 tapered to correspond with the tapered tip 65 so that by screwing the nozzle 63 forward, the water passage can be shut off entirely, or so regulated as to permit only a predetermined amount of water to enter the nipple 40. The nozzle 63 is held in adjusted position by means of a lock nut 69. The nozzle and lock nut are inserted through the screw threaded opening 70. This opening being sufficiently large to permit the passage of the nipple and nut, and after the desired adjustment is effected, a bushing 71 is placed within the opening which receives the nipple 19.

The mixing valve 18 is provided with openings 72 by means of which it may be attached to a block 73. The block 73 has one surface 74 made concave so as to fit the outer contour of the tank, and to the block are secured bands 75. These bands have out-turned ears 76 which are perforated so as to receive a bolt 77 by means of which the block can be secured to the tank. The purpose of thus securing the mixing valve is to hold the same rigid and relieve strain on the piping when the various valves are operated. These valves are preferably placed as close to the mixing valve as possible.

In Fig. 2 I have shown a modified form of tank in which the tank 78 is provided on its top with a screw threaded plug 79. This plug is for the purpose of filling the tank when there is no water system at hand or when liquids other than water are used. In a tank of this structure I employ glass gages 80 and 81, one being located near the top of the tank, the other near the bottom. This is for the purpose of ascertaining when the the tank has been filled to the proper height and also when the same is almost empty. The tank 78 is also provided with a relief valve 82 by means of which pressure from the inside of the tank can be released. The remainder of the connections on this tank are identical with the connections previously described.

The operation of the device illustrated in Fig. 1 is as follows:—

After the connections have been properly made, all the valves are closed off and the tank 27 filled to the required pressure. The valve 57 is then opened, after which the valve 51 is opened. This allows liquid to flow into the tank 7 until it reaches a level sufficiently high to permit it to flow to the valve 57 and pipe 58, this is an indication that the tank is sufficiently full of liquid. The valves 51 and 57 are then closed off. The valves 16 and 20 are then opened to permit air to pass through the air passage in the mixing valve and into the tank through the pipe 13 on top of the liquid. When a sufficient amount of pressure has been placed on top of the liquid, the valve 16 is closed and the valve 34 opened. The device is now ready to be used on an automobile, all that is now necessary is to place the automobile in position and open the valve 41. The opening of this valve permits water to be forced through the water passage and into the hose and at the same time air under pressure is delivered through the nozzle 63. The air and water intermingle as they pass through the opening 67 and enter the nipple 40 at a high rate of speed and under considerable pressure. In the nipple 40 however, a certain amount of expansion can take place but not sufficient however, to materially lessen the speed of the water and air to any great degree. The mingled water and air now pass through the hose and into the nozzle and issue from the tip, which is preferably provided with a restricted opening in the form of a high velocity spray which not only softens up the accumulated dirt, but due to the high speed at which the water and air mixture is delivered, readily floats off all of the dirt in considerably less time than is required with a hose and sponge, and also without danger of scratching the finish on the automobile.

When it is desired to use two hose so that the automobile can be washed simultaneously on both sides, the valves 37 in the pipe connection 38 are opened, as is the air valve to the other mixing valve. Then the valve 41 carried by this mixing valve is opened and the liquid from one tank will be forced through two mixing chambers. In this connection it is to be understood that the valves 16 and 34 of the tank not in use, remain closed during this operation. After one tank has been thus emptied, the valves 16 and 34 thereto are closed and the valves 16 and 34 of the other tank opened. This causes a reverse flow of the water and allows both nozzles to be used. While the second tank is emptying I may open the valves 51 and 57 and proceed to fill the first tank. In this manner my device is practically continuous in operation and both sides of an automobile can be washed simultaneously.

The operation of the device shown in Fig. 2 is precisely the same with the exception of the filling. In this instance, it is necessary to remove the plug 79 in order to fill the tank and the valve 82 can be used as an overflow to accurately gage the amount of liquid placed in the tank. This latter type of tank is especially useful in country garages where there is no water supply other than filling the tanks by bucket or by means of a hose attached to a pump which draws its water from a well or cistern.

After an automobile has been completely washed with my device it is also possible by closing off the valve 34 to allow only air to issue from the tip 46. This can be used for drying the automobile and it is also possible by the same means to use compressed air to dust the inside of the automobile, so it will be seen that my device is not only useful in washing the automobile but it can also be employed for dusting the interior thereof and for drying the automobile after washing.

Having fully described my invention, what I claim is:—

1. An automobile washing apparatus comprising a tank, means for introducing a liquid into said tank, means for introducing air under pressure into said tank, a mixer provided with an outlet, a nozzle adjustably located entirely in said mixer co-acting with said outlet for cutting off or regulating the amount of liquid passing through said mixer, means for passing air through said nozzle, means for admitting liquid under pressure to said mixer and a delivery means secured to said mixer.

2. An automobile washing apparatus comprising a tank, means for introducing a liquid under pressure into said tank, a mixer provided with an outlet, a nozzle adjustably located entirely in said mixer cooperating with said outlet for cutting off or regulating the amount of liquid passing through said mixer, means for passing compressed air through said nozzle, means for admitting liquid under pressure to said mixer, and a valve controlled delivery means secured to said mixer whereby mixture of compressed air and liquid can be discharged therefrom.

3. An automobile washing apparatus comprising an air tank, a liquid tank, a mixer having an air and a liquid passage and an outlet, an adjustable air nozzle located entirely in said mixer and communicating with said passages and co-acting with said outlet for cutting off or regulating the amount of liquid passing therethrough, means for introducing liquid into the liquid tank, an air passage between the mixer and liquid tank, an air passage between the air tank and mixer, a liquid passage between the liquid tank and mixer, and means for controlling the flow of liquid and of air through their respective passages.

4. An automobile washing apparatus comprising an air tank, a pair of liquid tanks, a mixer for each liquid tank, a valve controlled liquid connection between each mixer and its respective liquid tank, means located in the mixers for controlling the amount of liquid passing therethrough, a valve controlled liquid connection between said first mentioned liquid connections whereby liquid from either tank can pass through both mixers simultaneously, valve controlled connections between said air tank and the mixers and liquid tanks, and means for supplying liquid to said liquid tanks.

5. An automobile washing apparatus comprising a pair of liquid tanks, a mixer for air and liquid for each tank and means whereby either tank may be used with one or both mixers or both tanks may be used with both mixers.

6. An automobile washing apparatus comprising a pair of liquid tanks, a mixer for each tank and means whereby both mixers or one of them may be used with either tank.

7. An automobile washing apparatus comprising an air tank, a pair of liquid tanks, a mixer for each liquid tank, and connections between the tanks and mixers so that both mixers can be used to mix the contents of one or both liquid tanks.

8. An automobile washing apparatus comprising an air tank, a pair of liquid tanks, a mixer for each liquid tank, a liquid connection between each mixer and its respective liquid tank, a second connection between the air tank and both mixers, a third connection, connecting the first connections so that both mixers may be used to mix the contents of either or both tanks.

9. An automobile washing apparatus comprising a tank, a mixer provided with an outlet, means for supplying air to said mixer, means for supplying liquid to said mixer from said tank, an adjustable nozzle through which air passes located entirely within said mixer and cooperating with said outlet for cutting off or regulating the amount of liquid passing through said mixer.

10. An automobile washing apparatus comprising a plurality of liquid tanks, a mixer for each tank and means whereby all the mixers or any one of them may be used with any tank.

In testimony whereof, I have signed my name to this specification.

LOUIS J. BADARACCO.